United States Patent
Zielinski et al.

(10) Patent No.: US 7,017,409 B2
(45) Date of Patent: Mar. 28, 2006

(54) PROXIMITY SENSOR FOR LEVEL SENSING

(75) Inventors: Michael R. Zielinski, Holland, MI (US); Michael Jon Taylor, Longmont, CO (US)

(73) Assignee: Touchsensor Technologies, LLC, Wheaton, IL (US)

( * ) Notice: Subject to any disclaimer, the term of this patent is extended or adjusted under 35 U.S.C. 154(b) by 0 days.

(21) Appl. No.: 10/828,705

(22) Filed: Apr. 21, 2004

(65) Prior Publication Data

US 2005/0081624 A1    Apr. 21, 2005

Related U.S. Application Data

(60) Provisional application No. 60/464,439, filed on Apr. 22, 2003.

(51) Int. Cl.
*G01F 23/00*    (2006.01)

(52) U.S. Cl. ............ 73/304 C; 73/304 R; 73/290 R

(58) Field of Classification Search ............. 73/304 R, 73/290 R, 304 C
See application file for complete search history.

(56) References Cited

U.S. PATENT DOCUMENTS

| | | | | |
|---|---|---|---|---|
| 4,350,039 A | * | 9/1982 | van Dyke et al. | 73/304 C |
| 4,352,159 A | * | 9/1982 | Colby | 702/52 |
| 4,383,444 A | * | 5/1983 | Beaman et al. | 73/304 C |
| 4,451,894 A | * | 5/1984 | Dougherty et al. | 702/52 |
| 4,749,988 A | | 6/1988 | Berman et al. | |
| 5,423,214 A | * | 6/1995 | Lee | 73/304 C |
| 5,437,184 A | * | 8/1995 | Shillady | 73/304 C |
| 5,613,399 A | * | 3/1997 | Hannan et al. | 73/304 C |
| 6,125,696 A | * | 10/2000 | Hannan et al. | 73/304 C |
| 6,138,508 A | * | 10/2000 | Hannan et al. | 73/304 C |
| 6,320,282 B1 | | 11/2001 | Caldwell | |
| 6,713,897 B1 | | 3/2004 | Caldwell | |
| 2002/0116999 A1 | | 8/2002 | Heger | |
| 2003/0122432 A1 | | 7/2003 | Caldwell | |
| 2004/0124714 A1 | | 7/2004 | Caldwell | |

OTHER PUBLICATIONS

Copy of International Search Report from the corresponding PCT application.

* cited by examiner

*Primary Examiner*—Hezron Williams
*Assistant Examiner*—Rodney Frank
(74) *Attorney, Agent, or Firm*—Jenner & Block LLP

(57) ABSTRACT

A field effect sensor is adapted for use in sensing level of fluids and powders. The sensor uses elongated, parallel electrodes disposed on or within the side wall of a tank. The longitudinal axes of the electrodes are parallel to the surface of fluid or powder contained in the tank.

9 Claims, 2 Drawing Sheets

PROXIMITY SENSOR FOR LEVEL SENSING

CROSS-REFERENCE TO RELATED APPLICATIONS

This application claims priority from U.S. Provisional Patent Application Ser. No. 60/464,439, entitled "Electrode Designs for Sensing Level of Low Dielectric Constant Fluids and Substances," filed on Apr. 22, 2003, the disclosure of which is incorporated herein by reference.

BACKGROUND OF THE INVENTION

1. The Technical Field

The present invention is directed generally to level sensing. More particularly, the present invention is directed to proximity sensors having electrodes adapted for sensing level of fluids and other substances.

2. The Prior Art

It often is convenient or necessary to know the level of fluid in a tank or other container. Known means for doing so include sight glasses, measuring sticks, floats with mechanical linkages which indicate level and floats connected to electrical sending devices. Though widely used, these types of level sensing equipment are not without shortcomings. Whereas sight glasses can provide highly accurate, visual indication of fluid level, they generally must be located at or near the tank whose fluid level is to be measured, and they generally cannot be used to provide remote level indication. Further, the top and bottom of a sight glass generally must be plumbed into the side wall of the tank whose fluid level is to be measured, increasing the potential for fluid spills. Measuring sticks, such as dip sticks, also require presence at the tank whose fluid level is to be measured, and they cannot readily be used remotely. Measuring sticks have the further disadvantage that they must be physically inserted into the fluid whose level they are measuring. As such, their use increases the chance of contaminating the fluid being measured.

Floats with mechanical linkages for level indication are often used in small power equipment, such as lawn mowers, garden tractors, and the like. Such devices can provide reasonably accurate indication at relatively low cost. However, they generally provide only local indication and are not readily adapted for providing remote indication. Further, they are prone to failure due to vibration, exposure to the elements, and other harsh environmental conditions during ordinary use.

Floats with mechanical linkages connected to electrical senders have long been used to detect and provide remote indication of fluid level in tanks, such as automobile gas tanks. Such devices typically are mounted inside a tank and require sufficient space inside the tank to allow movement of the float and linkage as the fluid level rises and falls. As such, devices of this nature place constraints on tank design and packaging efficiency. Further, such units operate on the assumption that the tank cross section from top to bottom is substantially uniform, such that fluid volume within the tank is simply a function of the height of fluid in the tank. Such units typically would not give accurate data when used in tanks with irregular cross sections. Although multiple units could be used to mitigate this concern, such use would add cost, complexity, and might not be feasible in all situations due to space constraints.

Field effect sensors can detect proximity of some fluids, such as water. However, conventional field effect sensors are not sensitive to certain other fluid types, for example, hydrocarbons such as gasoline.

SUMMARY OF THE INVENTION

The present invention senses level of a fluid or powder uses a proximity sensor having elongated, generally parallel electrodes, each having a longitudinal axis generally parallel to the surface of the fluid or powder the level of which is to be measured.

DETAILED DESCRIPTION OF THE ILLUSTRATED EMBODIMENTS

Figure 1:
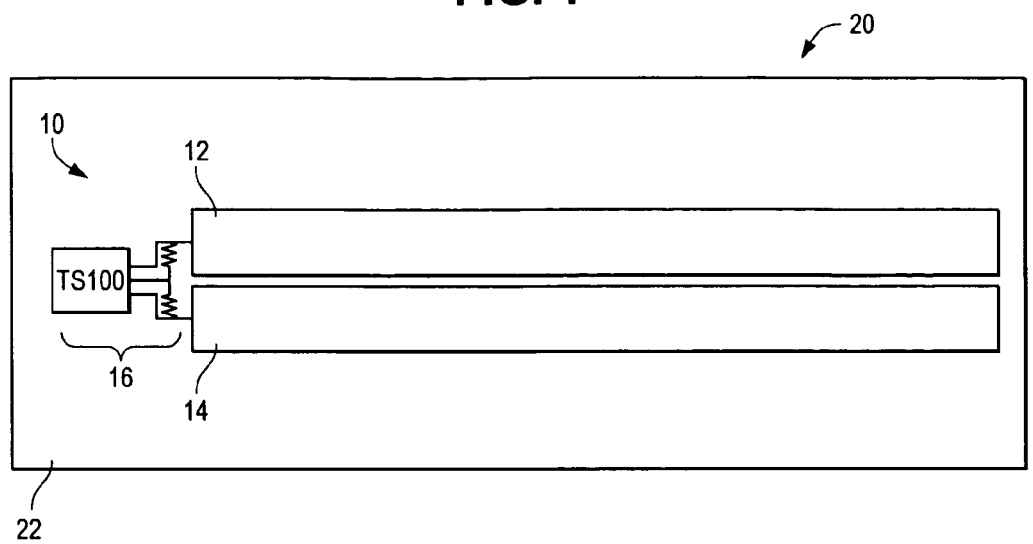
FIG. 1 is a representation of an electrode design according to the present invention.

FIG. 1 illustrates a field effect sensor 10 located on the side wall 22 of a tank 20 containing a fluid, such as the gas tank of an automobile. In other embodiments, tank 20 could contain multiple fluids or a powder. Preferably, sensor 10 is located on the outside of tank 20, but also could be located on the inside of tank 20. Alternatively, sensor 10 could be embedded within the side wall 22 of tank 20.

Sensor 10 includes first and second, substantially parallel, electrodes 12,14 coupled to a control circuit 16. Preferably, control circuit 16 is embodied as the control circuit provided with the TS100 sensor available from TouchSensor Technologies, LLC of Wheaton, Ill. Many of the design and operating principles of the TS100 sensor are described in U.S. Pat. Nos. 6,230,282 and 6,713,897 and related U.S. patent application Ser. Nos. 10/272,377 10/725,908, the disclosures of which are incorporated herein by reference.

Electrodes 12,14 differ from conventional sensor electrodes in that they are generally elongated and parallel. Preferably, electrodes 12,14 are disposed on tank 20 such that their longitudinal axes are substantially parallel with the surface of the fluid contained within tank 20. Generally, the greater the ratio of electrode length to width, the more quickly sensor 10 responds to stimuli proximate to an electrode, as discussed further below. Also, closely spaced pairs of electrodes provide greater resolution. That is, a sensor 10 using a closely spaced pair of electrodes generally is more sensitive to small changes in level a sensor 10 using a widely spaced pair of electrodes. However, a sensor using a closely spaced pair of electrodes may be more prone to providing erratic indication resulting from, for example, sloshing of fluid within tank 20.

Figure 2:
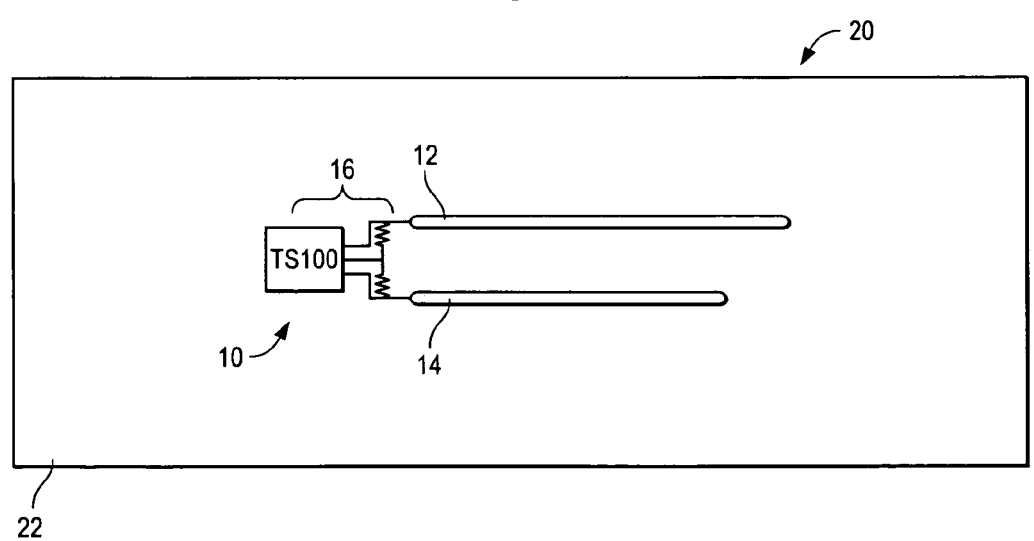
FIG. 2 is a representation of an alternative electrode design according to the present invention.

Electrodes 12,14 can be embodied in many different forms. For example, they can comprise thin, parallel, equal length planar traces, as illustrated in FIG. 1. They can comprise cylindrical rods of unequal length, as illustrated in FIG. 2. In other embodiments, they can resemble unequal length planar traces or equal length cylindrical rods. They also can comprise rods of dissimilar diameter. Their overall shapes and cross-sections can vary, as well. In general, similar electrodes respond to similar stimuli substantially equally. An electrode that is longer, wider, or of greater cross-sectional area than another electrode generally is more sensitive to a given stimulus. This principle can be used to tailor a sensor's sensitivity and ability to reject common mode interference as needed or desired in connection with a given application. Generally, improved sensitivity comes with decreased ability to reject common mode interference. Whereas FIGS. 1 and 2 show electrodes 12,14 as generally linear, electrodes 12,14 can be configured to wrap around or otherwise conform to the side wall of tank 20.

Sensor 10 preferably is disposed on a flexible or rigid substrate (not shown) which is bonded to or otherwise integrated with tank 20. For example, the substrate bearing sensor 10 can be embedded within the side wall of tank 20. Alternatively, sensor 10 can be disposed directly onto or embedded within tank 20, omitting the substrate.

When both electrodes 12,14 sense the same medium, for example, air/vapor above the surface of gasoline in an automobile's gas tank, both electrodes 12,14 have similar capacitance-to-ground. Put another way, when both electrodes 12,14 sense the same medium, the electric field coupling of each electrode to ground is substantially the same, resulting in negligible electric field potential between the two electrodes. In this condition, sensor 10 is in the "off" state. As the liquid level rises, covering lower electrode 14, the electric field potential between lower electrode 14 and upper electrode 12 increases until it is great enough to switch sensor 10 to the "on" state, as would be known to one skilled in the art. As the liquid level continues to rise, covering upper electrode 12, the electric field potential between upper electrode 12 and lower electrode 14 returns to a negligible level. In this condition, sensor 10 returns to the "off" state. (The foregoing discussion assumes that both electrodes are similarly configured. The capacitance-to-ground of the two electrodes could differ in the condition where both electrodes sense the sam medium if one electrode is longer, larger, or otherwise configured substantially differently than the other, as would be understood by one skilled in the art. Thus, a sensor's response to level changes in tank 20 can be adjusted by adjusting the structure of electrode 12 relative to the structure of electrode 14.)

Figure 3:
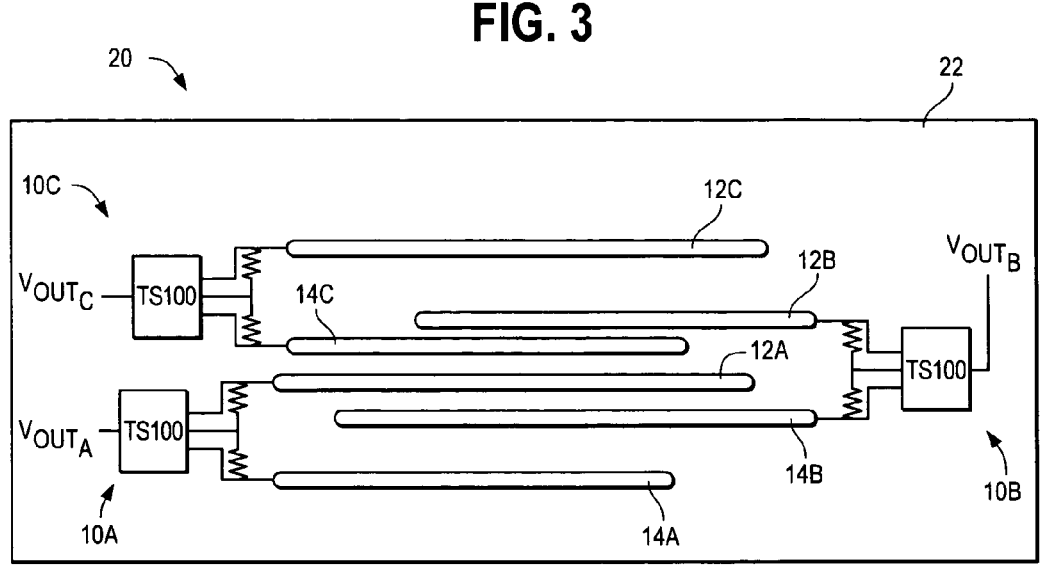
FIG. 3 is a representation of a plurality of sensors having electrode designs according to the present invention for measuring the level of a substance in a tank.

FIG. 3 illustrates how a plurality of sensors 10A–10C disposed on or embedded within the side wall of a tank 20 can be used to provide substantially continuous indication of the fluid level within the tank. When the fluid level is lower than the lower electrode 14A of lowermost sensor 10A, each of sensors 10A–10C is in the "off" state. When the fluid covers only lower electrode 14A of lowermost sensor 10A, sensor 10A is in the "on" state and sensors 10B,10C are in the "off" state. When the fluid also covers lower electrode 14B of intermediate sensor 10B, sensors 10A,10B are in the "on" state and sensor 10C is in the "off" state. When the fluid also covers upper electrode 12A of sensor 10A, sensor 10A is in the "off" state, sensor 10B is in the "on" state, and sensor 10C is in the "off" state. When the fluid also covers lower electrode 14C of uppermost sensor 10C, sensor 10A is in the "off" state and sensors 10B, 10C are in the "on" state. When the fluid also covers upper electrode 12B of sensor 10B, sensors 10A,10B are in the "off" state and sensor 10C is in the "on" state.

In the preferred embodiment, the outputs $V_{outA}$–$V_{outC}$ of sensors 10A–10C are coupled to a microcomputer (not shown) which converts the sensor outputs to level indication. For example, with sensor 10A in the "off" state and sensors 10B and 10C in the "on" state (corresponding to the condition where electrodes 12A, 14A, 14B, and 14C are covered), the microcomputer (not shown) would provide an output indicating that tank 20 is about half full, assuming that tank 20 has a substantially uniform cross section. If tank 20 has non-uniform cross-section, the tank geometry can be taken into account in the microcomputer's analysis so as to yield an accurate level indication.

Though described above in terms of measuring the level of a single fluid, the present invention also can be used to measure the level of a powder in a container, or to measure the level of an interface between different liquid layers in a container. One skilled in the art would know how to modify the teachings of this disclosure without departing from the scope of the claims which define the invention.

We claim:

1. An apparatus for sensing the level of a substance contained in a tank having a bottom portion and a side wall portion, comprising:
   a first, thin planar electrode associated with said side wall portion;
   a second, thin planar electrode associated with said side wall portion;
   said second electrode arranged on said side wall portion substantially above said first electrode with respect to said bottom portion;
   said first electrode coupled to a first resistor and to a first input of a detection circuit;
   said second electrode coupled to a second resistor and to a second input of a detection circuit;
   a strobe line coupled to said first resistor and said second resistor;
   wherein said detection circuit produces a low-level output when said fluid substantially covers neither said first nor said second electrode;
   wherein said detection circuit produces a low-level output when said fluid substantially covers both said first and said second electrode;
   wherein said detection circuit produces a high-level output when said fluid substantially covers one, but not both, of said first and said second electrodes.

2. The apparatus of claim 1 wherein said substance is a liquid.

3. The apparatus of claim 2 wherein said liquid has a low dielectric constant.

4. The apparatus of claim 2 wherein said liquid has a high dielectric constant.

5. The apparatus of claim 1 wherein said substance is a powder.

6. The apparatus of claim 1 wherein at least one of said first and said second electrode is disposed on said side wall portion of said tank.

7. The apparatus of claim 6 wherein said at least one of said first and said second electrode is disposed on an outside surface of said side wall portion of said tank.

8. The apparatus of claim 6 wherein said at least one of said first and said second electrode is disposed on an inside surface of said side wall portion of said tank.

9. The apparatus of claim 1 wherein at least one of said first and said second electrode is embedded within said side wall portion of said tank.

* * * * *